UNITED STATES PATENT OFFICE.

JAMES PIPERNO, OF NEW YORK, N. Y.

MANUFACTURE OF SYNTHETIC MILK.

1,267,449.  Specification of Letters Patent.  Patented May 28, 1918.

No Drawing.  Application filed May 7, 1917. Serial No. 167,077.

*To all whom it may concern:*

Be it known that I, JAMES PIPERNO, subject of the King of Spain, and resident of New York city, in the county of New York and State of New York, have invented certain new and useful Improvements in the Manufacture of Synthetic Milk, of which the following is a specification.

The object of my invention is to produce from sources, mainly vegetable and the like, a synthetic milk which will have all of the beneficial properties of cows' milk, but will eliminate its harmful properties.

Hitherto, the soy bean has been the principal ingredient of synthetic vegetable milk because of its richness in proteid and its whitish color. This milk, however, has been found most objectionable to the palate. The soy bean being a pulse food contains an alkaloid called xanthin, the harmful properties of which are well known. Its action is poisonous, causing diarrhea, and is entirely unfit as a food for invalids and children.

My invention consists in the manufacture of a synthetic milk, in which the first element is intended to produce vegetable fats and organic salts, the second element to produce protein, carbohydrates and organic salts, these elements being extracted by ebullition, the resultant liquids being mixed together and a lactic culture added while the mass is warm.

A preferred mixture and method of manufacture is as follows: For a three quart mixture, a cocoanut is peeled and grated and the gratings boiled in three quarts of wat... for a sufficient length of time to reduce the water to one half the quantity. This produces a liquid of homogeneous character containing in solution the necessary f-ts and organic salts. A similar quantity of water is added to three ounces each of rice and oatmeal, the mixture being boiled until it is reduced to one half the quantity. This produces a liquid containing in solution the necessary carbohydrates, protein and organic salts. The two liquids are then mixed together and filtered, then to produce a full rich milk, one pint of pure milk or an equivalent of powdered milk, or an equivalent amount of milk manufactured under my improved process which has been allowed to remain until the lactic bacilli have generated, is added to generate the necessary lactic bacilli. The excess fats which have risen to the surface are taken off in any convenient manner, and used for edible purposes. The mixture is then sterilized for the purpose of preservation.

In place of the cocoanut any other nuts can be used, such as almonds, butter-nuts, walnuts, etc. I am not limited to nuts, but seeds such as water-melon seeds or any natural vegetable oil-producing element can be employed.

The protein (nitrogenous) matter and carbohydrates is extracted from the cereals like rice, wheat, oats, hominy, corn, etc., by boiling. In the same way, I am not limited to use cereals above named, but any cereal or its equivalent can be used.

The milk has the great advantage over cows' milk in that it can be made absolutely pure. The objections to cows' milk are that many of the diseases to which the cow may be subject are transmitted to invalids who drink the milk. Again, the cows' milk often coagulates in the stomach of those persons, producing indigestion and constipation. The synthetic milk produced by my manufacture is absolutely free from germs or contamination; it is agreeable to the taste and can be assimilated in the ordinary system within 40 minutes. Since the only salts contained in the milk are organic salts, they are not open to the objection of mineral salts, which are not assimilated into the system. The organic salts used in the mixture act as a nerve tonic and as a builder of bone tissue. In this way I obtain milk of different grades, all appropriate for human consumption, all nourishing.

With the above synthetic milk, I can make all the usual products made from cows' milk, such as cheese, butter, cream, etc., with the added advantage that none of the harmful preservatives which are used for the preservation of cows' milk and its by-products are needed in connection with my milk.

Having described my invention, what I claim is:—

1. A synthetic milk consisting of an element producing fats and organic salts, an element for the production of protein, carbohydrates and organic salts, a lactic culture, the first and second elements being extracted by ebullition, the resultant liquids being mixed together and the culture added while the mass is warm.

2. A synthetic milk consisting of a natural vegetable element producing fats and organic salts, an element for the production of protein, carbohydrates and organic salts, a lactic culture, the first and second elements being extracted by ebullition, the resultant liquids being mixed together and the culture added while the mass is warm.

3. A synthetic milk consisting of a natural vegetable element producing vegetable fats and organic salts, a natural vegetable element for the production of vegetable protein, carbohydrates and organic salts, a lactic culture, the first and second elements being extracted by ebullition, the resultant liquids being mixed together and the culture added while the mass is warm.

4. A synthetic milk consisting of an element producing fats and organic salts, a mixture of cereals and water producing a natural vegetable element for the production of protein, carbohydrates and organic salts, a lactic culture, the first and second elements being extracted by ebullition, the resultant liquids being mixed together and the culture added while the mass is warm.

5. A synthetic milk consisting of a mixture of nuts and water producing vegetable fats and organic salts, a mixture of cereals and water producing a natural vegetable element for the production of protein, carbohydrates and organic salts, a lactic culture, the first and second elements being extracted by ebullition, the resultant liquids being mixed together and the culture added while the mass is warm.

Signed at New York city in the county of New York and State of New York.

JAMES PIPERNO.